Aug. 1, 1967  R. W. WALKER  3,333,616
SLICER AND DICER FOR FOODSTUFFS
Filed April 2, 1964  3 Sheets-Sheet 1
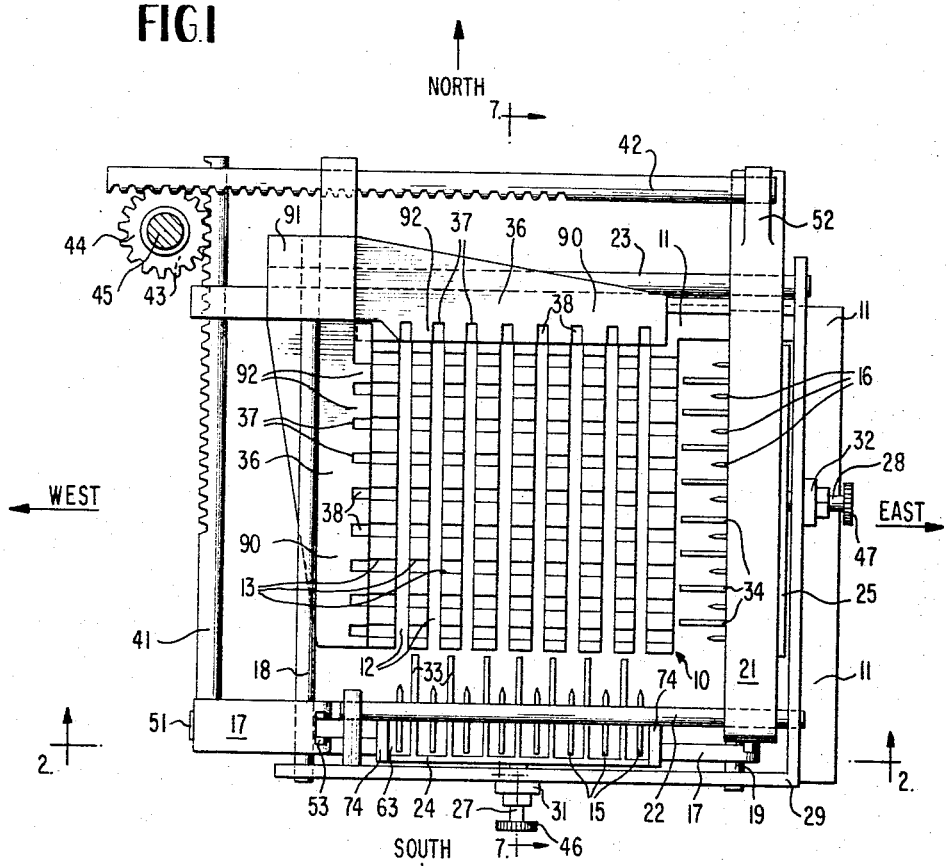
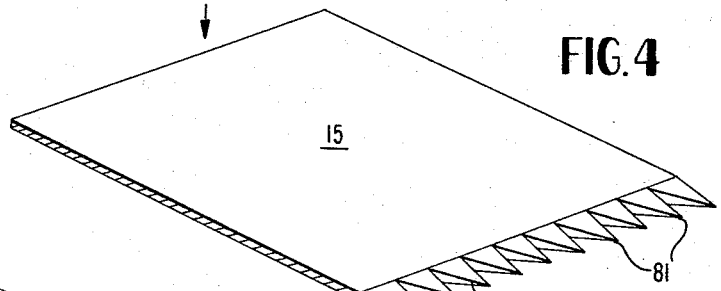
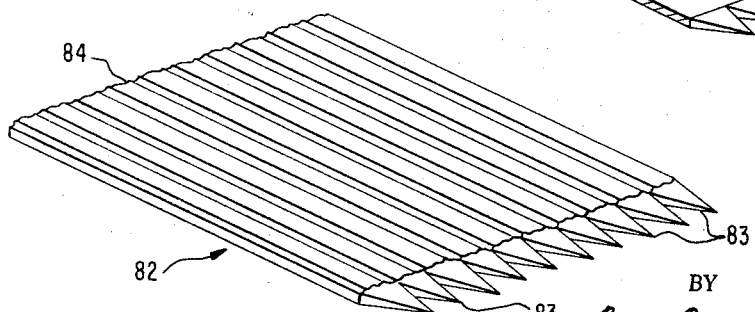
INVENTOR.
RONALD W. WALKER
BY
Burns, Doane, Benedict, Swecker & Mathis
ATTORNEYS

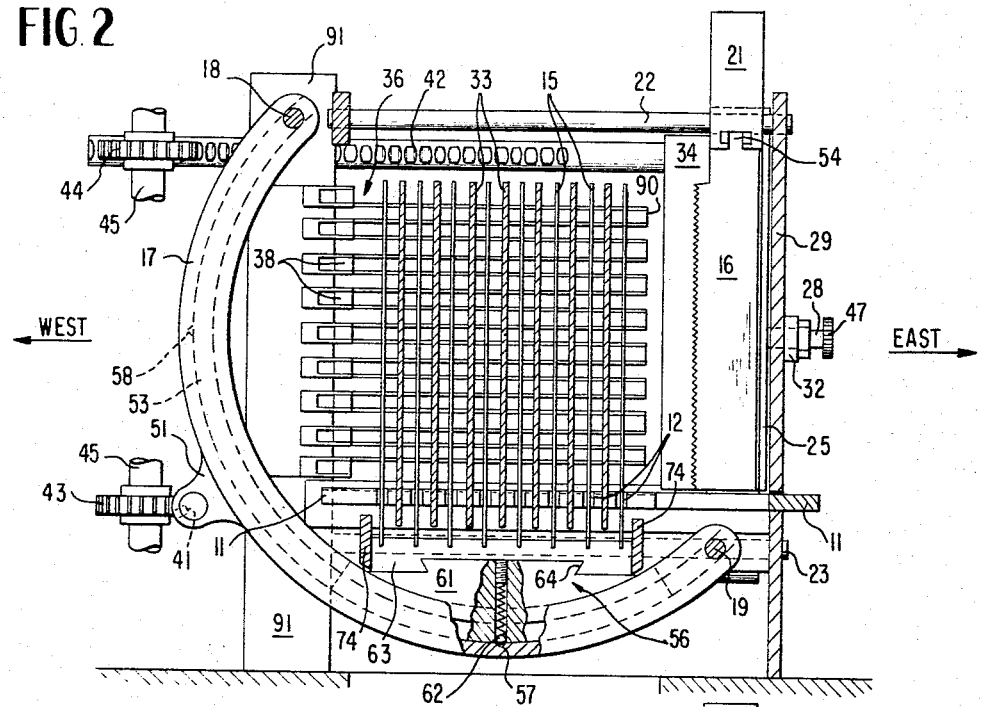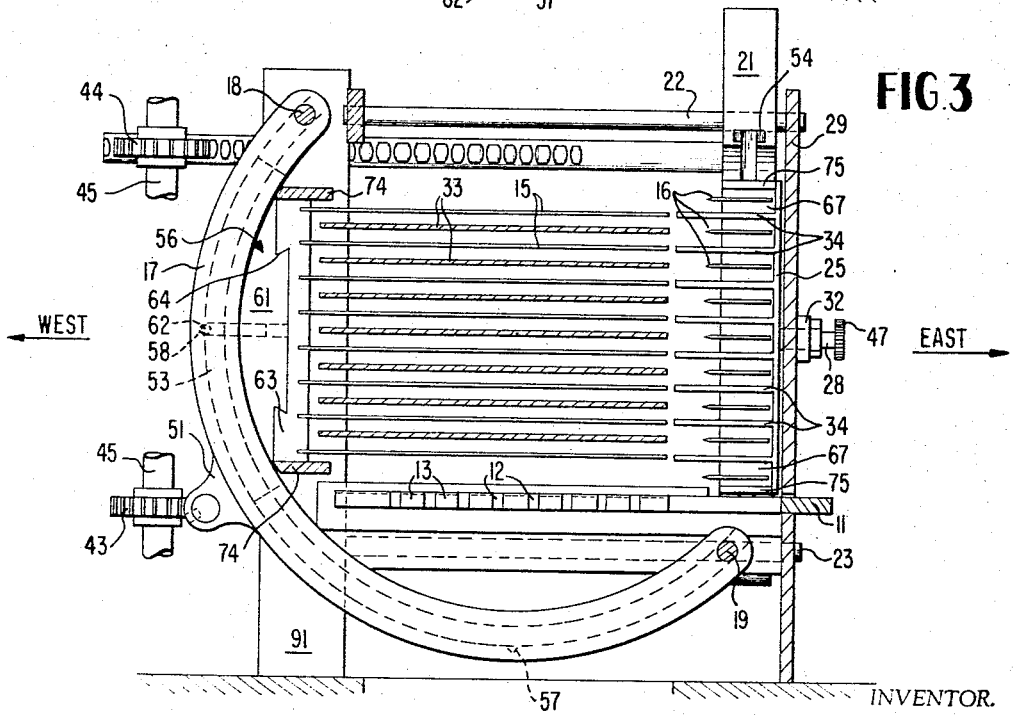

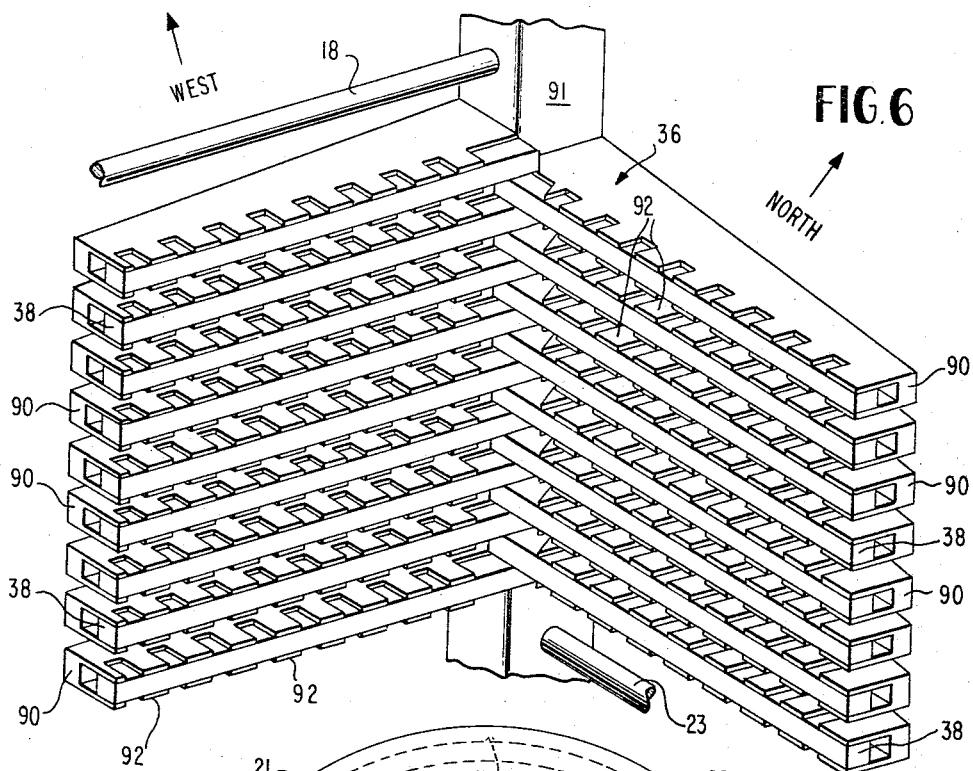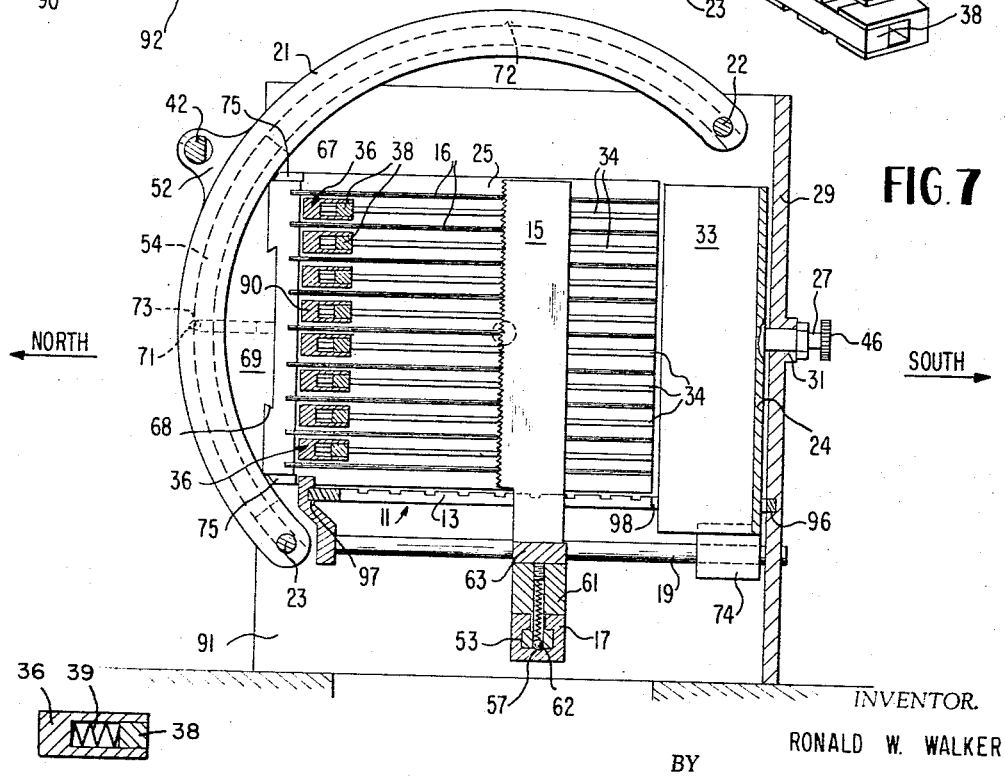

United States Patent Office 3,333,616
Patented Aug. 1, 1967

3,333,616
SLICER AND DICER FOR FOODSTUFFS
Ronald W. Walker, 1600 Pierce St.,
Amarillo, Tex. 79102
Filed Apr. 2, 1964, Ser. No. 356,913
10 Claims. (Cl. 146—78)

This invention relates to machines for the slicing and dicing of foodstuffs, and more particularly to machines processing a special versatility for selectively slicing or dicing different kinds of foodstuffs into a variety of sizes and shapes.

The need has long existed for a machine for use in restaurants and other food preparation centers to cut foodstuffs into a variety of shapes and sizes, both utilitarian and attractive, in a quick and efficient manner. Unfortunately machines which are efficient as slicers are not ordinarily effective as dicers and vice versa. Slicers and dicers employed in the canning industry where emphasis must be on high volume production rather than upon versatility have not found a great acceptance in commercial kitchens. In addition, machine-operated slicers and dicers which operate well upon one kind of foodstuff will almost invariably do poorly on another kind. For example, an efficient meat dicer, if made to operate upon potatoes or tomatoes will seldom produce an attractive product because the cutting forces typically applied in such machines will tend to degrade the shape of a softer foodstuff. On the other hand the cutting blades of a potato slicer may find difficulty in penetrating the tough skin of a tomato or in passing through the tissue of meats.

As a consequence of these difficulties and others most machines for the slicing and/or dicing of foodstuffs are single purpose units or have at best a limited range of versatility in the operations which they can perform and in the foodstuffs on which they are effective.

It is accordingly a general object of this invention to provide a novel and versatile machine for the slicing and dicing of foodstuffs into a number of preselected shapes and sizes under the control of an operator.

A further object of the invention is to provide an improved foodstuff slicer having selectively positioned knife blades for performing a variety of cutting operations in rapid sequence.

A still further object of the invention is to provide food slicers having a novel knife blade structure having a uniquely configured cutting surface capable of penetrating and slicing with relative ease foodstuffs of different textures.

By way of a brief summary of a preferred embodiment of the invention a food slicing machine is provided having a generally cubical foodstuff container. The top of the container is open for receiving foodstuffs therein and the bottom is movable to the side to empty the contents of the container after cutting operations have been performed upon them. Two sets of knife blades are provided with their cutting edges inwardly facing from two adjacent sides of the container. Each set of knife blades is made up of a plurality of parallel blades mounted at one end in a blade holder. In their normal positions these blades extend the length of one side of the cubical container and are spaced equally across the breadth thereof. The blade holder in which the blades are set is selectively rotatable between two positions ninety degrees apart in order to line the blades up in either horizontal or vertical cutting positions. For this purpose each of the two blade holders is mounted for sliding movement along an arcuate supporting rail which extends partially, but not completely, around the side of the container at which the blades are positioned. To effect the movement of the blade holder with its attached blades from one to the other of its two operating positions spaced ninety degrees apart, a rotatable positioning member is located immediately behind each of the two sets of knife blades. The positioning member engages the blade holder to slide it along its associated arcuate rail thereby to select the position of the blades before the initiation of a cutting operation.

Each of the arcuate rails is connected to a transport mechanism to be driven across the foodstuff container from the side at which it is normally positioned to the other side, thereby drawing the associated knife blades through the center of the container. After a slicing operation by one blade set in one direction, the other blade set may be driven across the interior of the container, slicing the foodstuff in additional mutually parallel planes. Because the blade sets are rotatable, each knife blade set may be repositioned after a slicing operation and drawn through the foodstuff container to further slice the foodstuff along parallel planes perpendicular to the slices product by the previous cutting operations of the same blade set. The possible configurations which may be produced with such a machine range all the way from large chunks and broad slices at one end of the spectrum through thin slices and waffle cuts to string cuts and cubes of different sizes at the other end of the spectrum.

In a preferred embodiment of the invention the knife blades are provided with cutting edges of a special configuration tending to facilitate the cutting of tough or thick skinned foodstuffs without requiring the knife blades to be given a sawing motion in the passage through such foodstuffs. The cutting edges of the blades comprise a continuous series of angular projections resembling the teeth of a saw, each of which converges to an acute-angle piercing point.

Although the scope of the invention is not to be limited except by the claims appended hereto, further details of the invention as well as additional objects and advantages will be better understood with reference to the following more detailed description taken together with the accompanying drawings in which:

FIGURE 1 is a top plan view of a combination slicer and dicer constructed in accordance with this invention;

FIGURE 2 is a cross-sectional view taken on line 2—2 of FIGURE 1;

FIGURE 3 is a view similar to FIGURE 2 but showing the knife blades rotated to different cutting positions;

FIGURE 4 is an enlarged perspective view of a portion of one of the knife blades shown in the preceding figures;

FIGURE 5 is a view similar to FIGURE 4 showing an alternate form of knife blade constructed according to this invention;

FIGURE 6 is a perspective view of the blade-receiving gridwork shown in FIGURE 1;

FIGURE 7 is a cross-sectional view taken on lines 7—7 of FIGURE 1 but showing one of the blade structures advanced partially across the interior of the foodstuff container; and FIGURE 8 is a detail cross section through interconnected members of the gridwork.

In FIGURE 1 there may be seen from the top a foodstuff slicer and dicer constructed in accordance with this invention. This structure, which may be mounted in any suitable housing or enclosure, is shaped to provide an interior foodstuff-containing area 10. Because of the numerous grill-like openings in its sides and bottom, I prefer to call the foodstuff-containing area 10 a basket. At the bottom of the basket 10 is a plate 11 having a number of parallel slots 12 therethrough defining a series of spaced apart fingers 13 for supporting foodstuffs placed within the basket. This plate 11 is slidable toward the right side of the drawing, as will be seen more clearly in subsequent drawings, for the purpose of dropping an included foodstuff into a collecting receptacle after preselected slicing operations have been performed upon the foodstuff.

Along two sides of the basket 10 are separate sets 15 and 16 of parallel knife blades in a rack arrangement with their leading cutting edges facing into the interior of the basket 10. The set of knives 15 at the bottom of FIGURE 1 on a side of this structure which may be called the south side is mounted by means to be described in greater detail hereinafter on an arcuate rail 17 extending around part but not all of the south side. At positions close to its ends the arcuate rail 17 is mounted for sliding movement along the lengths of polished stationary slide posts 18 and 19. Such movements of the arcuate rail 17 transport the attached set of knife blades 15 through the interior of the basket 10 to the opposite or north side thereof. Slide post 18 is located near the top of the basket on the west side of the structure, whereas post 19 extends along the bottom of the basket on the east side.

In similar fashion, the second set of knives 16 is mounted on another arcuate rail 21 which extends around a portion of the east side of the basket 10. This arcuate rail 21 is mounted for sliding movements on posts 22 and 23 in a direction perpendicular to the path of movement of the arcuate rail 17 for movement from the east side of the basket at which it is shown to the opposite or west side. It should be noted that post 22 extends along the top edge of the south side of the structure whereas post 23 is located adjacent the bottom edge of the north side.

Mounted adjacent each set of knives are respective positioning members 24 and 25 to which more extensive reference will be made hereinafter. These positioning members 24 and 25 include outwardly extending shafts 27 and 28 journaled in a rigidly mounted L-shaped bracket 29 by means of bearings 31 and 32. Rotation of shafts 27 and 28 effects corresponding angular displacements of the respective positioning members 24 and 25. Each of the positioning members 24 and 25 carries a row of barriers 33 and 34 which are located normally between adjacent blades of each respective set of the knives 15 and 16. The barriers 33 and 34 insure that when the blades 15 and 16 are returned to the south and east sides of the structure at which they are shown in FIGURE 1, any pieces of foodstuffs adhering to or jammed between the blades are swept off the blades and left in the center of the basket 10.

The north and west sides of the basket 10 are lined with a gridwork 36 having slots 37 therein to receive the leading cutting edges of the knife blades 15 and 16 at the end of their cutting paths. In the interstices of these gridworks are located a number of resiliently biased members 38 which yield to the advancing knife blades 15 and 16 and spring back to the positions shown as the knife blades retreat. As in the case of the barriers 33 and 34 previously referred to, these resiliently biased interstitial members 38 assure that no food sections adhere to the north and west sides of basket 10 after the conclusion of a cutting operation.

For transporting the arcuate rails 17 and 21 across the basket to the north and west sides and for returning these rails to their initial positions on the south and east sides respectively, the arcuate rails 17 and 21 are each provided with attached rack gears 41 and 42. Rack gear 41 is located adjacent the bottom edge of the west side of the structure whereas the other rack gear 42 attached to arcuate rail 21 is located adjacent the top edge of the north side. Both rack gears 41 and 42 cooperate with pinions 43 and 44 on a vertically extending drive shaft 45. Only the pinion 44 which meshes with rack gear 42 is shown, however, because of the fact that this pinion overlies and obscures the one beneath it.

In order to simplify and clarify the presentation of this invention, certain mechanical driving connections have been omitted from FIGURE 1 and from those which follow. The omitted drive connections are considered nonessential to an understanding of the invention set forth herein. In fact, in connection with any particular physical embodiment of the invention, a wide variety of linkages and drive assemblies may be used to provide for fully automatic, semiautomatic or even manual operation of the assembly. Thus, for example, the two pinions such as 44 which cooperate with rack gears 41 and 42 respectively could be moved vertically along the drive shaft into and out of engagement with the respective rack gears 41 and 42 to establish selective and/or sequential driving connections through the rack gears to the arcuate supporting rails. For certain types of cuts, as will be seen, both rack gears 41 and 42 may be driven concurrently to force both knife sets 15 and 16 simultaneously through the center of the basket 10. In addition, the outer ends of the shafts 27 and 28 on the blade positioners 24 and 25 are shown provided with gears 46 and 47 respectively thereon for the purpose of exerting a selective torque on the blade positioners about their journaled axes. These gears 46 and 47 may similarly be driven automatically or semiautomatically or may even be adjusted manually by a mechanism under the control of an operator. It is therefore to be understood that the practice of this invention is independent of the particular external driving means which may be selected for imparting driving or positioning forces to the parts of the structure shown and described herein.

Turning now to FIGURE 2 which is a cross-sectional view taken on line 2—2 of FIGURE 1, the arcuate configuration of rail 17 and the manner in which it is mounted at its ends to posts 18 and 19 for sliding movement along the lengths of these posts may be clearly seen. The rack gear 41 is attached to rail 17 by a bracket 51 secured to the outer side of rail 17. The rack gear 42 is similarly connected to rail 21 by a bracket 52, as best seen in FIGURE 1. Both rails 17 and 21 are channel-shaped and have elongated undercut slots 53 and 54 facing inwardly toward the centers of their curvatures.

A two-part blade support 56 is mounted on the rail 17 for movement along the rail 17 to separate cutting positions spaced ninety degrees of arc apart. The separate cutting positions are indexed by the detents 57 and 58 cut into the base of the slot. The blade support 56 includes a slidable shoe portion 61 having a flanged configuration interfitting with the sides of the undercut slot 53 in the rail 17. At bottom center of the sliding shoe 61 a spring biased ball 62 cooperates with the detents 57 and 58 to keep the blade holder in either of its two principal cutting positions spaced apart by ninety degrees. This structure permits the shoe portion 61 to be moved along the rail without becoming dislodged from the rail.

A blade holder 63 to which blades 15 are permanently attached, as for example by being embedded therein, is fastened to the sliding shoe 61 by a dovetailed joint 64 and may be held firmly thereon by a screw, clamp or the like. The dovetailed joint 64 permits the removal of the set of blades 15 together with their blade holder 63 for the purpose of cleaning or sharpening the blades or for substitution of a blade set having knives of different configurations or spacings.

An inspection of FIGURE 7, which is a view taken on line 7—7 of FIGURE 1, will show that the second set of knife blades 16 is mounted on its arcuate rail 21 in substantially the same fashion. Thus, the knife blades 16 are embedded firmly at one end in a blade holder 67 which is attached by a dovetail joint 68 to a slidable shoe 69. The latter has a cooperative flanged configuration with the undercut slot 54 of the arcuate rail 21, permitting the slidable shoe 69 to be moved along the arc of the rail to different positions. Separate cutting positions spaced apart by ninety degrees of arc are indexed by separate detents 71 and 72 inside the rail 21 and by a cooperating spring-loaded ball 73 held captive in the slidable shoe 69.

When the first set of blades 15 is positioned vertically as shown in FIGURES 2 and 7 and are drawn across the interior of the basket 10, each blade passes through one of the slots 12 between the fingerlike projections 13 at the bottom of the basket. In moving in this fashion, the blades 15 slice any foodstuff included within the basket 10 along parallel perpendicular planes.

In similar manner, when the second set of blades 16 on the east side of the basket is drawn across the basket from the position which it occupies in FIGURE 2, an included foodstuff is sliced along mutually parallel vertical planes which intersect the cutting planes produced by the knives 15. The combination of these two cuts, which may be performed by immediately sequential passes of both arcuate rails along the basket, thus slices an included foodstuff into string-like pieces useful, for example, in the production of french fried potatoes.

Other cuts are possible by rotating the cutting blades into different cutting positions. The means for repositioning the knife blades includes the blade positioning members 24 and 25 which are nearly identical to each other. For example, as can be seen in FIGURE 3, the blade positioning member 25 is generally of rectangular configuration and is supported at its approximate center by the shaft 28 journaled for selective rotation in the bearing 32 borne by the supporting bracket 29. The barriers 34 on the blade positioner 25 serve not only to prevent foodstuffs from becoming lodged between knife blades, as previously mentioned, but also act as a safety device. When the blades 16 are in their home or initial positions, they are effectively sheathed between the barriers 34 which extend beyond the cutting edges of the blades 16. If an operator should have to reach into the basket 10 for loading or unloading purposes or for any other reason, his hands would be protected from the knives by the projecting ends of the barriers 34. The same is true, of course, of the barriers 33 which receive knives 15 of the other blade set.

Each of the blade positioners 24 and 25 is provided with a pair of projecting arms 74 and 75 respectively which embrace the base of the associated blade holder on both sides thereof. Rotation of the blade positioner 25 will therefore result in the blade support for knives 16 being moved along the arc of its associated rail 21 because of the engagement between arms 75 and the blade holder 67. When the arcuate rail 21 is driven across the basket 10, the blade holder 67 positioned therein moves away from engagement with arms 75 of the blade positioner 25 but returns to be cooperatively received by these arms 75 when the cutting operation is completed and the set of blades 16 returns to its initial position. The same cooperative relationship exists between positioning arms 74 of blade positioner 24 and blade holder 63. Thus, after a single cutting operation either or both of the blade sets 15 and 16 may be repositioned on its arcuate rail 17 or 21 and may thereafter be driven across the basket for a second cutting operation with its blades rotated ninety degrees from the positions occupied during the first cutting operation.

In FIGURE 3, an illustration generally along the lines of FIGURE 2, both sets of blades 15 and 16 are shown rotated ninety degrees from the positions illustrated in FIGURES 1 and 2. All knife blades are therefore disposed horizontally. It is to be noted, however, that the relative locations of the two sets of blades are such that the cutting planes of one set 15 are midway between those of the other set 16. This disposition of the respective knife blades is especially useful in producing very thin slices of a foodstuff. If the blades are corrugated along their length the resulting cut produced by the blades when in the FIGURE 3 position is known as a waffle cut. When the blades are in this position they may be driven simultaneously across the basket since neither set of blades would interfere with the movement of the other set of blades.

For the production of waffle cuts, simultaneous movement of both sets of blades is generally desirable because it produces a more uniform and attractive end product.

In addition to producing thick cuts, thin cuts, waffle cuts and string cuts this structure is also capable, without any further modification, of producing dice cuts in which the foodstuff is sliced into small cubes or rectangular solids. One manner in which a dice cut can be made is by first passing both sets of blades through the basket with the orientation shown in FIGURE 2 where the knife blades 15 and 16 are vertical. Then one or both of the blade sets is repositioned horizontally as shown in FIGURE 3 and an additional horizontal cut is performed on the foodstuff. The additional cutting operation may be performed with either one or both of the knife sets and may be accomplished either sequentially or simultaneously.

In FIGURE 4 is shown an enlarged portion of one of the knife blades 15 depicted in the preceding illustration. It is to be noted that the leading or cutting edge of the knife blade comprises a continuous series of projections 81 somewhat resembling the teeth of a saw except for the absence of the chisel shaped ends customarily found on a saw blade. These sharpened projections each converge at an acute angle to a point. When the sharpened points of such a blade meet with a tough-skinned foodstuff such as a tomato, they penetrate the skin with ease and continue their cutting operation even though the blade moves uniformly in a direction perpendicular to its edge without any oscillatory motion whatsoever. A typical approach to the cutting of thick skinned or tough foodstuffs has been to provide the blade or blades of the food cutter with a reciprocating motion as it moves along its cutting path. Providing the cutting blades with such a movement is a complication which may be avoided in the versatile food cutter described herein by the use of a cutting blade configured as shown in FIGURE 4.

An alternate form of cutting blade 82 is shown in FIGURE 5 to comprise a similar continuous row of projections 83 on the cutting edge each converging to an acute-angled point as in the preceding example.

This blade, however, is provided with a rippled configuration on both sides having corrugations extending from the leading edge at points 83 to the trailing edge 84 of the blade. A blade so configured is especially useful in producing ornamental cuts of foodstuffs. Two sets of such blades when driven simultaneously across a foodstuff in interleaving relationship as described in connection with FIGURE 3 produce an especially attractive waffle cut while imparting to thin cuts of foodstuffs an improved mechanical integrity.

In the perspective view of FIGURE 6 there may be seen with greater clarity the structure of the gridwork 36 positioned at the north and west sides of the foodstuff-containing basket 10. A plurality of spaced apart parallel arms 90 extend substantially over the entire interior north and west sides of the basket from a supporting post 91 at the northwest corner. Each of the arms 90 is slotted along its length and serrated across its inner edge to define a number of grid-like teeth 92 arranged in horizontal columns and vertical rows. Within the longitudinal slot of each extending arm 90 is positioned a yieldable barrier member 38 flush with the ends of the teeth 92 in its associated arm 90. These barrier members 38 are biased toward the positions shown by resilient members 39 behind the barrier members. The resilient members 39 (FIGURE 8), may take the form of springs, as shown, or hollow air-filled gaskets or the like. The spacings between the separate teeth 92 lining each side of the gridwork permits the advancing edge of the knife blades to enter the interstices between the gridwork of teeth 92 and to force the resiliently biased members 38 back into the slots in the extending arms 90. If the blades are disposed horizontally each blade meets but one barrier member 38 as it reaches the end of its path. On the other hand if the blades are disposed vertically each cutting edge contacts a number of resiliently biased members simultaneously at points between vertical rows of teeth. This type of gridwork is especially useful where, as in the examples illustrated herein, the sharpened edge of the knife blades comprises a series of converging sharp points. When the knife blades approach the end of their cutting paths, the foodstuff is held on the projecting teeth 92 of the grid-like pattern, whereas the cutting points of the knife blades are received between the teeth 92 and cut completely through the foodstuff.

After all of the desired and preselected cutting operations have been performed on a foodstuff included within the basket 10, the basket may be emptied by sliding the bottom plate 11 drawer-like along supporting ledges at opposite edges thereof. As can be seen in FIGURE 7, the bottom plate 11 of the basket 10 is slidably mounted at one edge in a slot 96 in the bracket 29 and at its opposite edge on a ledge 97 extending from the supporting post 91.

It is to be noted in FIGURE 7 that the bottom plate 11 of the basket includes a cutout portion 98 at one side thereof into which knife blades 15 and the associated blade holder 63 and blade positioner 24 rotate when the blades are in their vertical position. Thus, when blades 15 are in their vertical position and are transported across the center of the basket 10, each of the blades 15 passes from the cutout space 98 in the bottom plate 11 and enters one of the spaces 12 between the fingerlike projections 13 in the bottom plate 11. On the other hand, when blades 15 are repositioned horizontally and are transported through the interior of the basket 10, the blades 15 pass between the parallel arms 90 on the west side of the structure. In similar manner when blades 16 are positioned horizontally and forced through the interior of the basket 10, they pass through the spaces between the parallel arms 90 on the north side of the structure.

It can be seen from the preceding description that the food slicer and dicer illustrated and described possesses the capability of performing a large number of selective cuts on foodstuffs without special adaptations or modifications to the structure. Although but one embodiment of a food slicer and dicer has been represented, it should be understood that this embodiment is offered as illustrative of the principles of the invention and not necessarily limiting. Certain variations and substitutions will doubtless occur to those skilled in the arts to which this invention pertains and the appended claims are therefore intended to cover all such variations and substitutions within the spirit and scope of the invention in its broader aspects.

What is claimed is:
1. A machine for slicing foodstuffs comprising:
a container for foodstuffs;
a first knife blade set including a plurality of cutting blades and means for supporting said blades in spaced apart parallel relationship and inwardly directed at one side of said container;
a second knife blade set including a plurality of cutting blades and means for supporting said last mentioned blades in spaced apart parallel relationship and inwardly directed at another side of said container adjacent said one side;
means for selectively forcing said knife blade sets across the interior of said container in mutually intersecting directions to respectively opposite sides thereof to perform cutting operations on foodstuffs within said container, and
blade-positioning means for selectively rotating at least one of said knife blade sets between first and second angularly displaced cutting orientations.

2. A machine for slicing foodstuffs comprising:
a generally rectangular container for foodstuffs;
a first knife blade set including a plurality of cutting blades and means for supporting said blades in spaced apart parallel relationship and inwardly directed at one side of said container;
a second knife blade set including a plurality of cutting blades and means for supporting said last mentioned blades in spaced apart parallel relationship and inwardly directed at another side of said container adjacent said one side;
means for selectively forcing said knife blade sets across the interior of said container to respectively opposite sides thereof to perform cutting operations on foodstuffs within said container; and
blade positioning means for selectively rotating each of said knife blade sets between opposite cutting orientations substantially ninety degrees apart.

3. A machine for slicing foodstuffs comprising a generally rectangular container having a substantially fixed bottom for supporting the foodstuffs thereon during slicing and having fixed side walls extending upwardly from the bottom at angles to each other, a first knife blade set including a plurality of cutting blades and means for supporting said blades in spaced apart parallel relationship and inwardly directed at one upright side wall of said container; a second knife blade set including a plurality of cutting blades and means for supporting said last-mentioned blades in spaced apart parallel relationship and inwardly directed at another upright side wall of said container adjacent said one side wall, means for selectively forcing said knife blade sets across the interior of said container to respectively opposite sides thereof to perform cutting operations on foodstuffs within said container, and means defining a gridwork lining each of said upright side walls, said gridwork including rows of rigidly mounted members with slots therein in position to receive the cutting edges of the blades upon movement of the respective knife blade sets across the container.

4. A machine for slicing foodstuffs comprising:
a container for the introduction therein of foodstuffs;
at least one knife set comprising a plurality of elongated parallel cutting blades extending along one side of said container, each of said blades having a leading cutting edge extending substantially the length thereof and comprising a continuous series of projections each converging to an acute-angled piercing point for the penetration of foodstuffs, said cutting edges facing toward the interior of said container;
means for drawing said knife set transversely across said container to force the cutting edges of said blades through the interior of said container to the opposite side thereof; and
means defining a gridwork lining the side of said container opposite said one side, said gridwork including rows of rigidly mounted members and interstitial yieldable members positioned to be engaged by the cutting edges of said blades and to yield to the advance thereof, thereby to permit said cutting edges to pass between said rigidly mounted members.

5. A machine for slicing foodstuffs into selected sizes and shapes comprising:
a rectangular container having a bottom, four sides and a top for the introduction therein of foodstuffs to be sliced;
a pair of blade holders each mounted adjacent a respective one of two adjacent sides of said container for selective movement between first and second operating positions ninety degrees of arc apart;
a pair of knife sets each carried by a respective one of said blade holders and comprising a plurality of elongated parallel cutting blades, each set of blades extending normally along one of said two adjacent sides of said container with cutting edges facing toward the interior of said container, the blades of each set being disposed parallel to the top of said container when the associated blade holder is in its first operating position and being disposed perpendicular to the top of said container when the associated blade holder is in its second operating position;

means for selectively drawing each of said blade holders transversely across said container to force the cutting edges of said blades through the interior of said container to the opposite sides thereof; and means defining a gridwork lining the intersecting sides of said container opposite said two adjacent sides thereof, said gridwork including a plurality of spaced-apart cantilevered arms extending parallel to the top of said container from the included edge of said intersecting sides, the blades of each knife set when drawn across said container parallel to the top thereof being caused to pass between the cantilevered arms at the adjacent one of said intersecting sides.

6. A machine for slicing foodstuffs comprising:

a container for the introduction therein of foodstuffs to be sliced;

at least one knife set comprising a plurality of elongated parallel cutting blades extending along one side of said container, each of said blades having a leading cutting edge extending substantially the length thereof and facing toward the interior of said container;

means for drawing said knife set transversely across said container to force the cutting edges of said blades through the interior of said container to the opposite side thereof; and means defining a gridwork lining the side of said container opposite said one side, said gridwork including rows of rigidly mounted members and interstitial yieldable members positioned to be engaged by the cutting edges of said blades and to yield to the advance thereof thereby to permit said cutting edges to pass between said rigidly mounted members.

7. A machine for slicing foodstuffs into selected sizes and shapes comprising:

a rectangular foodstuff container;

an arcuate support rail positioned to extend partially around one side of said container in a plane parallel thereto;

a blade holder mounted on said support rail for selective movement along the arc of such rail between operating positions ninety degrees of arc apart;

a knife set comprising a plurality of elongated parallel cutting blades carried by said blade holder and normally extending therefrom along said one side of said container; each of said cutting blades having a leading cutting edge extending substantially the length thereof and facing toward the interior of said container;

means for drawing said support rail and its associated blade holder and blades transversely across said container to force the cutting edges of said blades through the interior of said container to the opposite side thereof;

a blade positioner located at said one side of said container; and means journaling said blade positioner for selective rotation about an axis normal to said one side, said blade positioner being engageable with said blade holder when said arcuate support rail is in its normal position to move said blade holder along said support rail from one of said operating positions to the other before said blades are drawn across the interior of said container.

8. A machine for slicing foodstuffs into selected sizes and shapes comprising:

a rectangular foodstuff container;

a pair of arcuate support rails, each normally positioned to extend partially around a respective one of two adjacent sides of said container in planes parallel thereto;

a pair of blade holders each mounted on a respective one of said support rails for selective movement along the arc of such rail between operating positions ninety degrees of arc apart;

a pair of knife sets each comprising a pluarlity of elongated parallel cutting blades carried by a respective blade holder, each set of blades extending from its associated blade holder along one of said adjacent sides of said container each of said blades having a leading cutting edges extending substantially the length thereof and facing toward the interior of said container;

means for selectively drawing each of said support rails and the respectively associated blade holders and blades transversely across said container to force the cutting edges of said blades through the interior of said container to the opposite sides thereof; and a pair of blade positioners each positioned at a respective one of said two adjacent sides and each being journaled for selective rotation about an axis normal to such side, each of said blade positioners being engageable with a respective one of said blade holders when the arcuate support rails associated therewith are in their normal positions to move said blade holders along said support rails from one operating position to another before said blades are drawn across the interior of said container.

9. A machine for slicing foodstuffs into selected sizes and shapes comprising:

a rectangular container for foodstuffs;

an arcuate support rail positioned to extend partially around one side of said container in a plane parallel thereto;

a blade holder mounted on said support rail for selective movement along the arc of such rail between operating positions ninety degrees of arc apart;

a knife set comprising a plurality of elongated parallel cutting blades carried by said blade holder and extending from such blade holder along said one side of said container, each of said blades having a leading cutting edge extending substantially the length thereof and comprising a continuous series of projections each converging to an acute-angled piercing point for the penetration of foodstuffs said cutting edges facing toward the interior of said container;

means for drawing said support rail and its associated balde holder and blades transversely across said container to force the cutting edges of said blades through the interior of said container to the opposite side therof;

means defining a gridwork lining the side of said container opposite said one side, said gridwork including rows and columns of rigidly mounted members and interstitial yieldable members positioned to be engaged by the cutting edges of said blades and to yield to the advance thereof, thereby to permit said cutting edges to pass between said rigidly mounted members;

a blade positioner located at said one side of said container; and means journaling said blade positioner for selective rotation about an axis normal to said one side, said blade positioner being engageable with said blade holder when said arcuate support rail is adjacent said one side of said container to move said blade holder along said support rail from one operating position to the other before said blades are drawn across the interior of said container.

10. A machine for slicing foodstuffs into selected sizes and shapes comprising:

a rectangular foodstuff container;

a pair of arcuate support rails, each normally positioned to extend partially around a respective one of two adjacent sides of said container in a plane parallel thereto;

a pair of blade holders each mounted on a respective one of said support rails for selective movement along the arc of such rail between operating positions ninety degrees of arc apart;

a pair of knife sets each comprising a plurality of elongated parallel cutting blades carried by a respective blade holder, each set of blades extending from its associated blade holder along one of said adjacent sides of said container, each of said blades having a leading cutting edge extending substantially the length thereof and comprising a continuous series of projections each converging to an acute-angled piercing point for the penetration of foodstuffs, said cutting edges facing toward the interior of said container;

means for selectively drawing each of said support rails and the respectively associated blade holders and blades transversely across said container to force the cutting edges of said blades through the interior of said container to the opposite sides thereof;

means defining a gridwork lining the sides of said container opposite said two adjacent sides, said gridwork including rows and columns of rigidly mounted members and interstitial yieldable members positioned to be engaged by the cutting edges of said blades and to yield to the advance thereof thereby to permit said cutting edges to pass between said rigidly mounted members; and a pair of blade positioners each positioned at a respective one of said two adjacent sides and each being journaled for selective rotation about an axis normal to such side, each of said blade positioners being engageable with a respective one of said blade holders when the arcuate support rails associated therewith are in their normal positions, thereby to move said blade holders along said support rails from one operating position to another before said blades are drawn across the interior of said container.

References Cited

UNITED STATES PATENTS

| | | | |
|---|---|---|---|
| 1,157,448 | 10/1915 | Stoltenberg | 146—78 |
| 1,943,113 | 1/1934 | Daum | 146—160 |
| 2,621,691 | 12/1952 | Brualdi | 146—151 X |
| 2,702,572 | 2/1955 | Kottmann | 146—169 |
| 2,853,109 | 9/1958 | Norton | 146—78 |
| 3,167,102 | 1/1965 | Vinette | 146—151 X |

WILLIAM W. DYER, JR., *Primary Examiner.*

W. GRAYDON ABERCROMBIE, *Examiner.*